(12) United States Patent
Gloudemans et al.

(10) Patent No.: US 6,400,733 B1
(45) Date of Patent: Jun. 4, 2002

(54) APPARATUS AND METHOD FOR RECOVERY OF RELATIVE SIGNAL TIMING

(75) Inventors: Paul R. Gloudemans, Flanders; Dominick Imbesi, Bridgewater, both of NJ (US); Joseph Punturieri, Staten Island, NY (US)

(73) Assignee: Agere Systems Guardian Corp., Allentown, PA (US)

( * ) Notice: Subject to any disclaimer, the term of this patent is extended or adjusted under 35 U.S.C. 154(b) by 0 days.

(21) Appl. No.: 09/203,974

(22) Filed: Dec. 2, 1998

(51) Int. Cl.⁷ .................................................. H04J 3/06
(52) U.S. Cl. ....................................... 370/509; 370/516
(58) Field of Search ................................ 370/503, 507, 370/508, 509, 510, 511, 512, 513, 514, 516, 518, 519; 375/354, 359, 360, 365, 366, 368, 371

(56) References Cited

U.S. PATENT DOCUMENTS

| | | | |
|---|---|---|---|
| 3,611,264 A | | 10/1971 | Ellis |
| 4,317,195 A | * | 2/1982 | Barberis et al. ............ 370/412 |
| 4,662,699 A | | 5/1987 | Vachhani et al. |
| 4,793,823 A | | 12/1988 | Cozzens et al. |
| 5,240,432 A | | 8/1993 | Daoud |
| 5,327,581 A | * | 7/1994 | Goldberg ................... 455/503 |
| 5,402,424 A | * | 3/1995 | Kou ........................... 370/324 |
| 5,637,011 A | | 6/1997 | Meyerhoefer et al. |
| 5,860,829 A | | 1/1999 | Hower et al. |
| 6,026,074 A | * | 2/2000 | Stadler et al. .............. 370/230 |

OTHER PUBLICATIONS

Technical Data Sheet of A.C. Egerton Limited, related to Mini Rocker Cross Connection Cabinets.

* cited by examiner

Primary Examiner—Kwang B. Yao
(74) Attorney, Agent, or Firm—Stroock & Stroock & Lavan LLP

(57) ABSTRACT

A method for maintaining the relative timing between each of a series of datastreams generated at a first site and transmitted to a second site including the steps of selecting a pulse generated by a clock having a time reference such as time-of-day and marking it with a descriptor. The descriptor and the time reference of the pulse are then transmitted to the second site. Next, a sample, that occurs after the pulse, is identified for each of the datastreams. An offset from the pulse to the next sample is then calculated for each of the datastreams. Next, the descriptor, a pointer to the next sample and the offset for each of the datastrearns is transmitted together with the corresponding datastreams to the second site. Using the pointer, the next sample in each of the datastreams is then located. Finally, the relative timing of each of the series of datastreams is reconstructed based on the next sample and the offset.

13 Claims, 5 Drawing Sheets

APPARATUS AND METHOD FOR RECOVERY OF RELATIVE SIGNAL TIMING

FIELD OF THE INVENTION

This invention relates to a communication system and, in particular, to an apparatus and method for transmitting and receiving a plurality of digital datastreams while maintaining the relative timing between each of the plurality of digital datastreams.

BACKGROUND OF THE INVENTION

Digital sampling and processing techniques used to represent and analyze the spectral content of an analog signal are widely known. In some instances, it is desirable to sample an analog signal using a variety of sampling rates thereby generating a series of sampled datastreams. Each of the sampled datastreams thus represents the spectral content of a different spectral bandwidth of the analog signal. The series of sampled datastreams are then processed to analyze the total spectral content of the analog signal. In order for the series of sampled datastreams to accurately reflect the spectral content analog signal, it is imperative that the relative timing between each of the sampled datastreams be maintained during processing.

The processing of the sampled datastreams is generally computationally intensive and thus requires substantial computing resources. The need for computing power is increased in situations that require the sampling of analog signals at different locations. In such cases, sufficient computing resources to process the sampled datastreams are required at each sampling location. It is more cost efficient, however, to transmit each of the sampled datastreams from the remote sampling sites to a central processing site for analysis. In this way, the computing resources of the central processing site are leveraged to support the processing requirements of multiple remote sites.

A problem occurs when a series of sampled datastreams collected from a remote site is transmitted to the central site for processing. Because delays exist in transmitting each of the series of sampled datastreams from the remote site to a central processing site, the relative timing between each of the series of sample datastreams is usually altered. If the relative timing of each of the series of the sampled datastreams is not preserved, the resulting spectral analysis of the analog signal will be erroneous. Accordingly, it is desirable to provide a method for transmitting a series of sampled datastreams to a central processing site while still maintaining the relative timing between each of the sampled datastreams.

SUMMARY OF THE INVENTION

The present invention is directed at overcoming the shortcomings of the prior art. The present invention is directed to a method for maintaining the relative timing between each of a plurality of sampled datastreams. A plurality of sampled datastreams are generated at a first site by sampling an analog signal at a plurality of sampling rates that are proportional to a master clock rate. Each of the plurality of sampled datastreams are then packetized into a data-packet stream and are transmitted to a second site. At the second site, the data-packet stream is converted back into the plurality of sampled datastreams. The method for maintaining the relative timing between each of the plurality of sampled datastreams at the second site includes the steps of selecting a pulse generated by the master clock having a time-of-day and marking the pulse with a descriptor. The descriptor and the time-of-day of the pulse are then transmitted to the second site. Then, a next sample, that occurs after the pulse, is identified for each of the sampled datastreams. An offset from the pulse to the next sample is then calculated for each of the sampled datastreams. Next, the descriptor, a pointer to the next sample, and the offset for each of the sampled datastreams are transmitted together with the corresponding sampled datastreams to the second site. Using the pointer, the next sample in each of the sampled datastreams is then located. Finally, the relative timing of each of the series of sampled datastreams is fixed based on the next sample, the offset and the time-of-day of the pulse.

Accordingly, a method is provided for transmitting a series of sampled datastreams to a second site while still maintaining the relative timing between each of the sampled datastreams at the second site.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
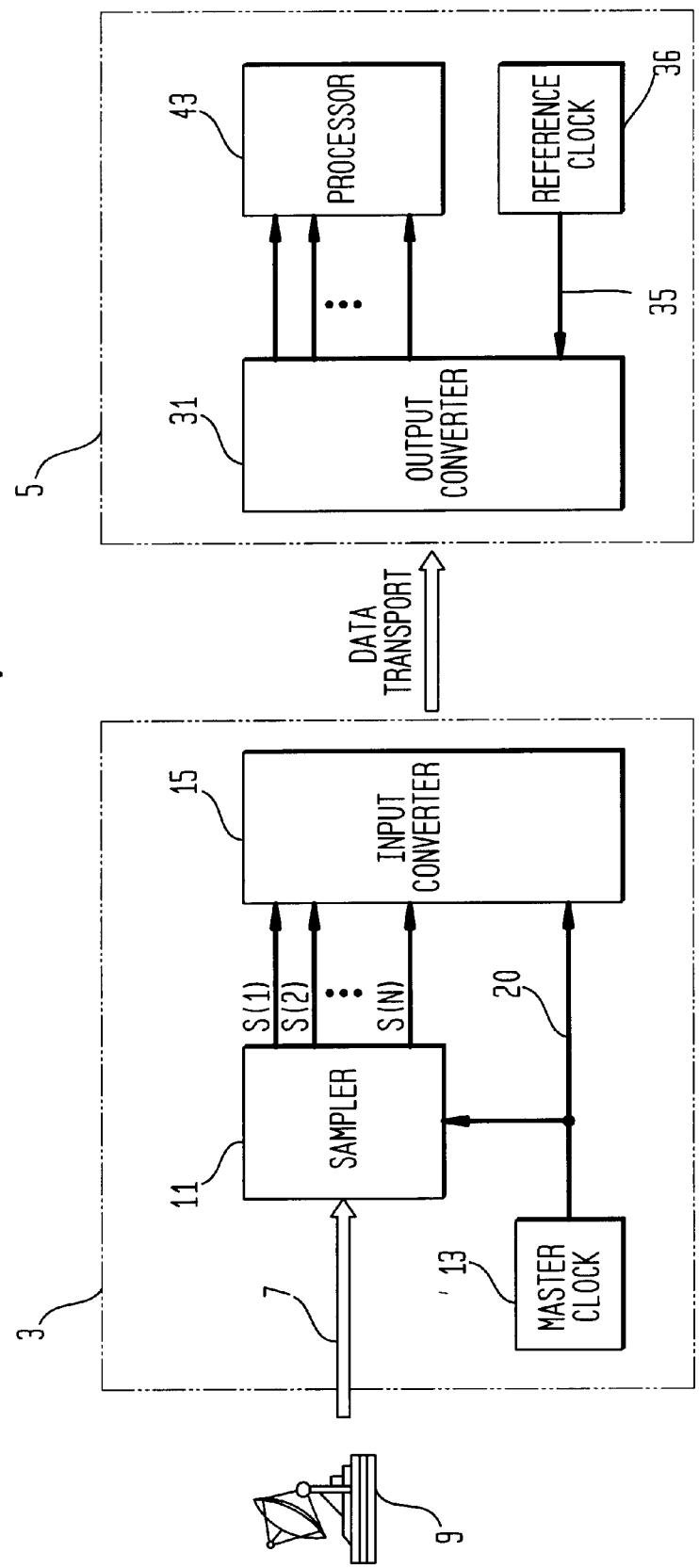
FIG. 1 is a block diagram of a system for transmitting a series of sampled datastreams from a remote site to a processing site in accordance with the present invention.

Referring now to FIG. 1, there is shown a system 1 for transmitting a plurality of sampled datastreams from a site 3 to a processing site 5 in accordance with the present invention. An analog signal 7 is received by an antenna 9 at site 3 and output to a sampler 11 located at site 3. Sampler 11 digitally samples analog signal 7 at N different sampling rates producing N sampled datastreams S(1)–S(N) with each of sampled datastreams S(1)–S(N) representing the spectral content of a particular frequency band of analog signal 7. In an exemplary embodiment, all of the sampling rates are derived from a clock signal 20 generated by a single master clock 13 in remote site 3. Alternatively, site 3 may include more than one master clock 13 with each master clock having a different frequency so that sampling rates based on different clock frequencies can be generated. Sampled datastreams S(1)–S(N) output from sampler 11 are received by an input converter 15.

Figure 2:
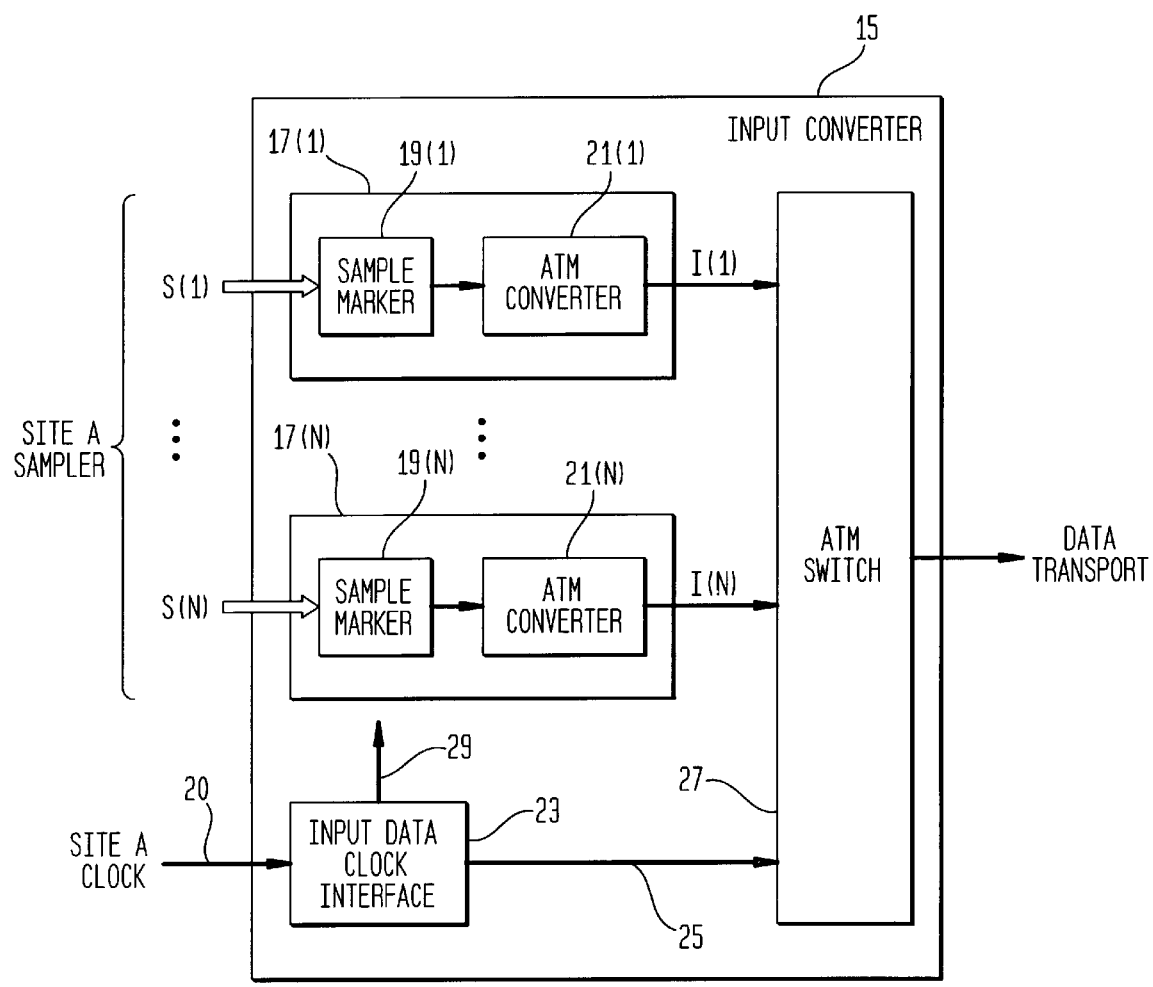
FIG. 2 is a block diagram of the input converter of the system in FIG. 1.

Referring now to FIG. 2, there is shown a block diagram of the input converter 15. Input converter 15 includes an input data clock interface 23 that receives clock signal 20 from master clock 13. Input clock data interface 23 periodically selects a pulse from clock signal 20 and calculates a time reference such as the time-of-day, of the selected pulse which reflects the absolute time the selected pulse occured. Input clock data interface 23 identifies the selected pulse with a descriptor D and places descriptor D and the time reference of the selected pulse into an ATM cell which is then output to an ATM switch 27 via a first clock interface output 25. ATM switch 27 then outputs the ATM cell containing descriptor D and the time reference information to processing site 5 using any of the transmission techniques known in the art. Input clock data interface 23 also outputs a pulse select output signal 29 which indicates that a clock pulse has been selected and also outputs descriptor D associated with the selected clock pulse.

Input converter 15 also includes a plurality of input port converters 17(1)–17(N) with each input port converter 17(1)–17(N) receiving corresponding sampled datastreams S(1)–S(N) output from sampler 11. Each of input port converters 17(1)–17(N) includes one of a plurality of sample markers 19(1)–19(N), respectively. Each of sample markers 19(1)–19(N) receives as an input one of sampled datastreams S(1)–S(N), respectively, as well as pulse select output signal 29 from input clock interface 23. Each of sample markers 19(1)–19(N) identifies the next sample of corresponding sampled datastream S(1)–S(N) that appears after receipt of pulse mark output signal 29 (i.e. after the selected clock pulse was selected), and it calculates an offset O, measured in clock cycles of clock signal 20 of master clock 13, between the receipt of pulse select output signal 29 and the next sample.

Figure 4:
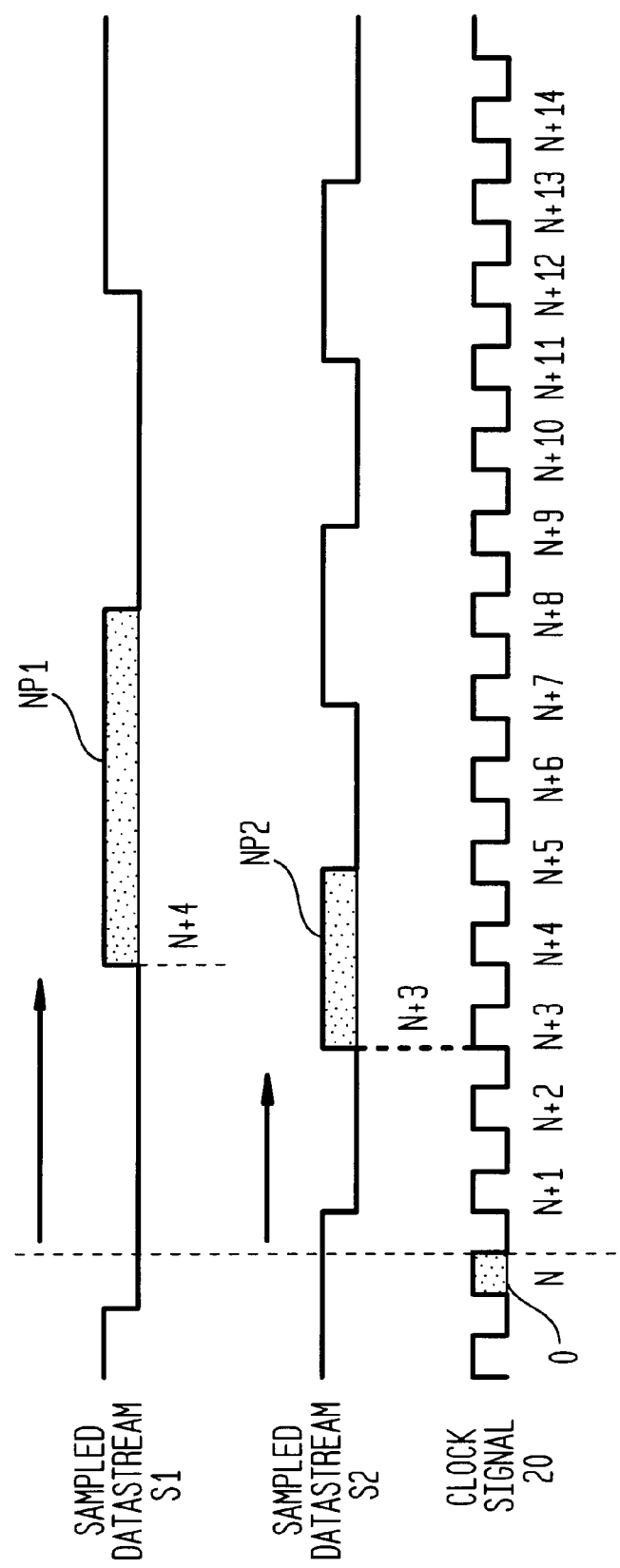
FIG. 4 is a timing diagram of the sampled datastreams and the master clock at the remote site.

Referring now to FIG. 4, there is shown a timing diagram of sampled datastreams S(1) and S(2), and clock signal 20, including a selected clock pulse having a descriptor D and occurring at time reference N. In this case, the offset between the selected clock pulse and the sample pulse NS(1) of sampled datastream S(1) is four clock pulses, while the offset between the selected clock pulse and the next sample NS(2) of sampled datastream S(2) is three clock pulses.

Each of sample markers 19(1)–19(N) outputs to one of a plurality of ATM Converters 21(1)–21(N), respectively, descriptor D associated with the selected clock pulse, a pointer P which indicates the location in the corresponding sampled datastream S(1)–S(N) of the next sample that appears after the selected clock pulse, calculated offset O between the selected clock pulse and the next sample after the selected clock pulse, and the corresponding sampled datastream S(1)–S(N).

Figure 5:
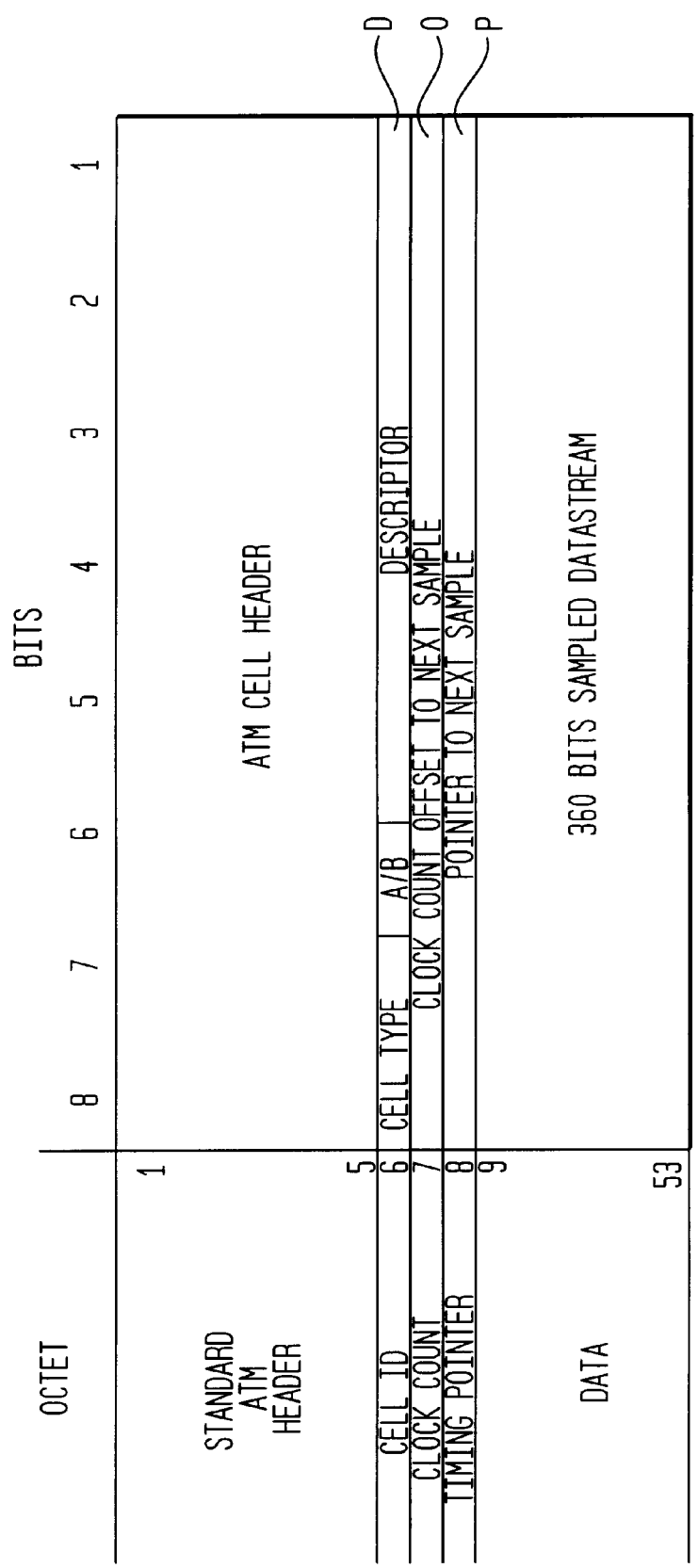
FIG. 5 is an ATM cell format used in accordance with the present invention.

Referring now to FIG. 5, there is shown an exemplary ATM cell format used in accordance with the present invention. Each of ATM converters 21(1)–21(N) receives the corresponding sampled datastream S(1)–S(N) and converts it into ATM cell packets using packetizing techniques well known in the art. Also, each of ATM converters 21(1)–21(N) place the corresponding selected clock pulse descriptor D, pointer to the next sample P and offset O into a reserved area of the ATM cell payload that contains the corresponding sampled datastream S(1)–S(N). ATM switch 27 receives the ATM cells output by ATM converters 21(1) –21(N) via input ports I(1)–I(N), respectively, which then transmits the ATM cells to processing site 5.

Figure 3:
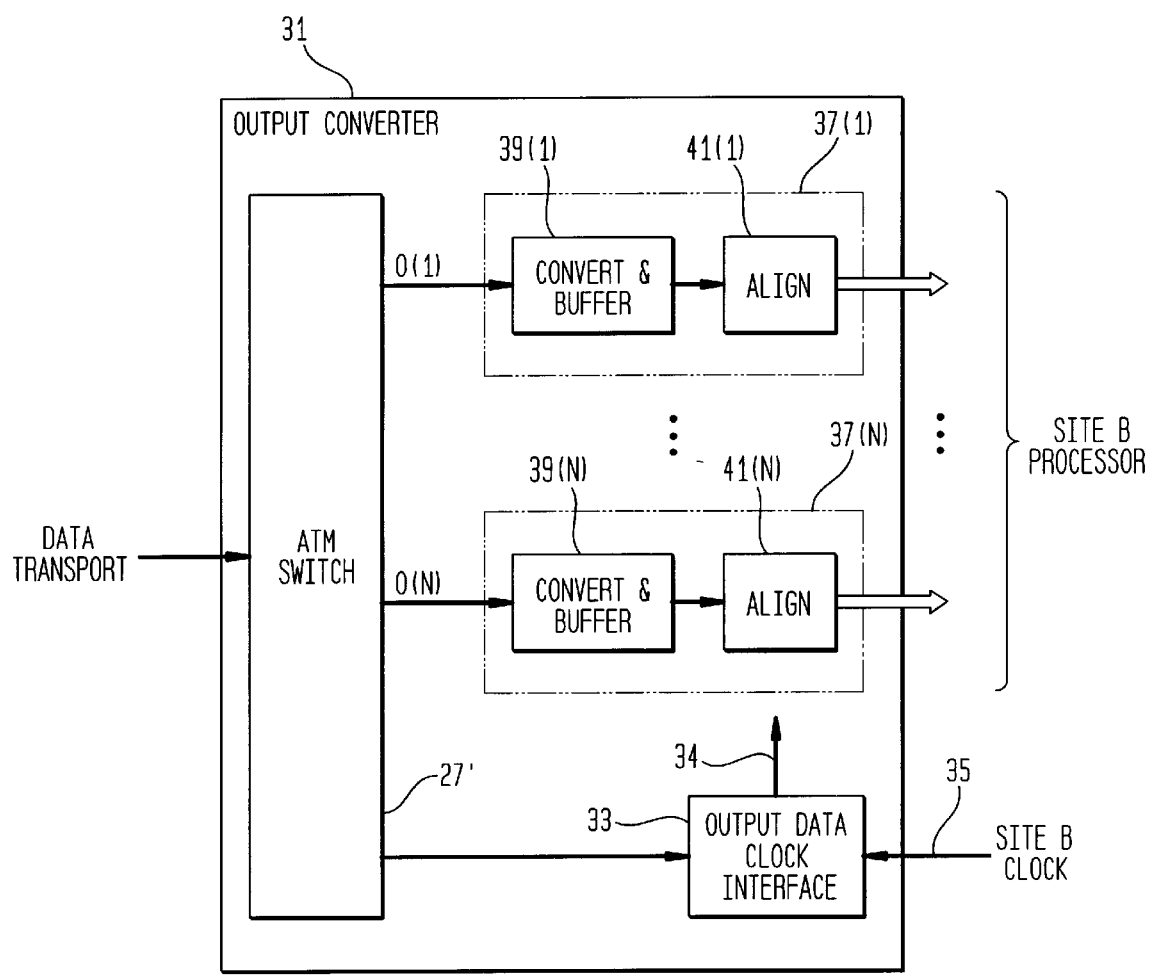
FIG. 3 is a block diagram of the output converter of the system in FIG. 1.

Referring now to FIG. 3, there is shown a block diagram of an output converter 31 of the present invention. The transmitted ATM cells are received at processing site 5 and are input into an ATM switch 27' included in output converter 31. The ATM cells that include selected clock pulse descriptor D and the time reference information are disassembled and descriptor D and the time reference information are routed to an output data clock interface 33. Output data clock interface 33 receives a reference clock signal 35 from reference clock 36 and outputs the selected clock pulse descriptor D and time reference information on descriptor receipt output signal 34.

ATM switch 27' also receives the ATM cells that include sampled datastreams S(1)–S(N) transmitted from remote site 3, and it outputs them to the corresponding one of a plurality of output port converters 37(1)–37(N) via output ports O(1)–O(N), respectively. Each of output port converters 37(1)–37(N) includes one of a plurality of ATM converter/buffers 39(1)–39(N) that recovers one of sampled datastreams S(1)–S(N) from the received ATM cells, respectively. Each of ATM converter/buffers 39(1)–39(N) also buffers one of sampled datastreams S(1)–S(N), respectively, until at least one ATM cell is received by each of output port converters 37(1)–37(N). Because each of sampled datastreams S(1)–S(N) was sampled at a different sampling rate at remote site 3, and because there are also varying transmission delays between remote site 3 and processing site 5, it is likely that some of output port converters 37(1)–37(N) may receive ATM cells before the others. Therefore, it is necessary to buffer each sampled datastream S(1)–S(N) prior to aligning the relative timing between sampled datastreams S(1)–S(N) so that each output port converter 37(1)–37(N) has received at least one ATM cell that includes descriptor D that is required for the alignment of sampled datastreams S(1)–S(N).

Each of ATM converter/buffers 39(1)–39(N) receives descriptor D and the time reference information from descriptor receipt output signal 34 of output data clock interface 33 and searches for descriptor D in each ATM cell payload it has received. After locating the ATM cell payload that contains descriptor D, pointer P and offset information O contained in the ATM cell payload are retrieved and output by each of ATM converter/buffers 39(1)–39(N), together with the corresponding sampled datastreams S(1)–S(N).

A plurality of datastream aligners 41(1)–41(N) receive sampled datastreams S(1)–S(N), as well as pointer P and offset information O for each sampled datastream S(1)–S(N), respectively, from the corresponding ATM converters/buffers 39(1)–39(N). Datastream aligners 41(1)–41(N) align the relative timing of sampled datastreams S(1)–S(N) by designating a clock pulse output from reference clock 36, which has the same clock frequency as master clock 13, as a reference pulse having the same time reference as that of the selected pulse. Next, pointer P associated with each sampled datastream S(1)–S(N) is used to locate the next sample contained in each sampled datastream S(1)–S(N). Then, the relative timing between each of sampled datastreams S(1)–S(N) and the reference pulse is adjusted so that the number of pulses of reference clock signal 35 that occurs between the next sample for each sampled datastream S(1) –S(N) and the reference pulse is equal to offset O for sampled datastream S(1)–S(N). By aligning each sampled datastream S(1)–S(N) with the reference pulse in this manner, the relative timing between each of sampled datastreams S(1)–S(N) as it occurred at remote site 3 is maintained at processing site 5.

Output port converters 37(1)–37(N) then output sampled datastreams S(1)–S(N), respectively, to a processor 43 which performs spectral analysis of sampled datastreams S(1)–S(N) keeping the relative timing intact.

While a system with only one remote site and one processing site was described above, it will be obvious to one of ordinary skill in the art to apply this invention to a system having multiple remote sites transmitting sampled datastreams to a central processing site for analysis. Also, although the use of ATM data transmission was described for transmitting from remote site 3 to processing site 4, it will be obvious to one of ordinary skill in the art that any other packet-data transmitting techniques may be used. Finally, it will be obvious to one of ordinary skill in the art that the method and apparatus of the present invention is not limited to datastreams generated by sampling an analog signal but will apply to any series of digital datastreams in which the relative timing of the digital datastreams is important.

Accordingly, a method and apparatus is provided in which an analog signal is detected and sampled at a plurality of sampling rates at a remote site and is then transmitted to a processing site while still maintaining the relative timing between each of the sampled datastreams.

Thus, while there have been shown and described and pointed out fundamental novel features as applied to preferred embodiments thereof, it will be understood that various omissions and the substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for maintaining the relative timing between each of a plurality of datastreams, each of said plurality of datastreams having a frequency that is proportional to a clock signal output from at least one clock located at a first site, each of said plurality of datastreams being packetized into one of a series of data packet streams, each of said data-packet streams being transmitted to a second site, each of said data packet streams being disassembled to reconstruct one of said plurality of datastreams, the method comprising the steps of:

selecting a pulse generated by said at least one clock, said pulse having a time reference;

marking said pulse with a descriptor;

transmitting said descriptor and the time reference of said pulse to said second site;

identifying a next sample for each of said plurality of datastreams occurring after said pulse;

calculating an offset from said pulse to said next sample for each of said datastreams;

transmitting said descriptor, a pointer to said next sample and said offset for each of said plurality of datastreams together with each of said plurality of datastreams to said second site;

locating said next sample in each of said datastreams using said pointer; and fixing the relative timing of each of said plurality of datastreams based on said next sample, said offset and the time reference.

2. The method of claim 1, wherein a reference clock at said processing site outputs a series of reference clock pulses, a clock frequency is associated with said at least one clock at the first site, and the same clock frequency is associated with said reference clock, and the method further comprises the steps of:

selecting one of the reference clock pulses;

setting said reference pulse to the time reference of said pulse; and adjusting the relative timing between each of said plurality of sampled datastreams so that the number of reference clock pulses output between said reference pulse and said next sample is equal to said offset.

3. The method of claim 1 further comprising the step of: buffering each of said datastreams at said second site.

4. The method of claim 1 wherein said descriptor, said time reference of said pulse, said offset, said pointer, and said datastreams are transmitted using packet-data transmission.

5. The method of claim 4 wherein said packet-data transmission is ATM transmission.

6. The method of claim 1 wherein said second site has a plurality of clocks each outputting a clock signal having a different frequency and each of said plurality of datastreams being proportional to said clock signal output from one of such plurality of clocks.

7. The method of claim 1, wherein said pulse has a time-of-day and time reference is equal to the time-of-day of said pulse.

8. A system for maintaining the relative timing between each of a plurality of datastreams, each of said plurality of datastreams having a frequency that is proportional to a clock signal output from at least one clock located at a first site, each of said plurality of datastreams being packetized into one of a series of data-packet streams, each of said data-packet streams being transmitted to a second site having a reference clock outputting a reference clock signal, each of said data packet streams being disassembled to reconstruct one of said plurality of datastreams, the system comprising:

an input clock interface receiving said clock signal and selecting a pulse having a time reference, said input clock interface marking said pulse with a descriptor and transmitting said descriptor and said time reference to said second site, said input clock interface outputting a pulse select output signal;

a plurality of input port converters, each of said plurality of input port converters receiving said pulse select output signal and one of said plurality of datastreams, each of said input port converters outputting a pointer to a next sample, an offset and said one of said plurality of datastreams for transmission to said second site;

a plurality of output port converters, each of said plurality of output port converters receiving one of said plurality of datastreams, said descriptor, said time reference and said reference clock signal and fixing the relative timing of each of said plurality of sampled datastreams based on said next sample and said offset.

9. The system of claim 8, wherein each of said plurality of output port converters has a buffer for buffering one of said plurality of datastreams.

10. The system of claim 8, wherein said descriptor, said time reference, said offset, pointer and said sampled datastreams are transmitted to said second site using packet-data transmission.

11. The system of claim 10, wherein said packet-data transmission is ATM transmission.

12. The system of claim 8, wherein said second site has a plurality of clocks each outputting a clock signal having a different frequency and each of said plurality of datastreams being proportional to said clock signal output from one of said plurality of clocks.

13. The system of claim 8, wherein said pulse has a time-of-day and the time reference is equal to the time-of-day of said pulse.

* * * * *